United States Patent
Gukal et al.

(10) Patent No.: US 10,049,171 B2
(45) Date of Patent: Aug. 14, 2018

(54) BATCH PROCESSED DATA STRUCTURES IN A LOG REPOSITORY REFERENCING A TEMPLATE REPOSITORY AND AN ATTRIBUTE REPOSITORY

(71) Applicant: CA, INC., Islandia, NY (US)

(72) Inventors: Sreenivas Gukal, Santa Clara, CA (US); Kiran Jyotsna Achyutuni, Bangalore (IN)

(73) Assignee: CA, INC., Islandia, NY (US)

( * ) Notice: Subject to any disclaimer, the term of this patent is extended or adjusted under 35 U.S.C. 154(b) by 732 days.

(21) Appl. No.: 14/482,400

(22) Filed: Sep. 10, 2014

(65) Prior Publication Data

US 2016/0070739 A1    Mar. 10, 2016

(51) Int. Cl.
  *G06F 17/00*   (2006.01)
  *G06F 17/30*   (2006.01)
  *G06F 17/40*   (2006.01)
  *G06F 11/34*   (2006.01)

(52) U.S. Cl.
  CPC .............. *G06F 17/40* (2013.01); *G06F 11/34* (2013.01); *G06F 17/30985* (2013.01); *G06F 2201/00* (2013.01)

(58) Field of Classification Search
  CPC ............................ G06F 11/34; G06F 2201/00
  See application file for complete search history.

(56) References Cited

U.S. PATENT DOCUMENTS

| | | | |
|---|---|---|---|
| 6,173,418 B1 * | 1/2001 | Fujino ................. | G06F 11/3476 714/20 |
| 9,223,843 B1 * | 12/2015 | Madhavarapu ... | G06F 17/30578 |
| 9,619,478 B1 * | 4/2017 | Singh ................. | G06F 17/30153 |
| 2006/0184529 A1 * | 8/2006 | Berg .................... | G06F 11/0709 |
| 2015/0039625 A1 * | 2/2015 | Nisbet ..................... | G06F 9/542 707/746 |

* cited by examiner

*Primary Examiner* — Charles E Lu
(74) *Attorney, Agent, or Firm* — Sage Patent Group

(57) ABSTRACT

A method by a computer includes, for each of a plurality of log records received as part of a log stream from a host machine node, identifying a template identifier within a template repository for a template string matching an invariant string of the log record, and identifying an attribute identifier in an attribute repository for an attribute string matching a variant string of the log record. The log records are partitioned into batches. Each of the batches are defined by a data structure that includes the template identifier and the attribute identifier for each of the log records within the batch. The data structures for each of the batches are stored into a log repository.

17 Claims, 4 Drawing Sheets

BATCH PROCESSED DATA STRUCTURES IN A LOG REPOSITORY REFERENCING A TEMPLATE REPOSITORY AND AN ATTRIBUTE REPOSITORY

TECHNICAL FIELD

The present disclosure relates to computer systems and more particularly to analysis of records of log streams generated by computer equipment.

BACKGROUND

Data centers can contain thousands of servers (both physical and virtual machines), with each server running one or more software applications. The servers and software applications generate log stream records to indicate their current states and operations. For example, software applications may output log records that sequentially list actions that have been performed and/or list application state information at various checkpoints or when triggered by defined events (e.g., faults) occurrences, etc.

These log records are stored and searched by systems operators for various purposes—e.g., to detect anomalies, troubleshoot problems, mine information, check the health of the servers etc. The log records can be generated on the order of millions per second in large data centers.

In existing processes, the log records are stored in a full-text index (FTI). An FTI allows complex text queries to be performed on the log records. Operators typically perform iterative full-text queries on the FTI of log records. The storage requirements of an FTI are proportional to the number of terms in the log records. The log records can be generated on the order of millions per second for large data centers. At these rates, storing the log records efficiently (both in terms of space and time), while also allowing for efficient searches, can be a significant challenge.

SUMMARY

Some embodiments disclosed herein are directed to a method by a computer. The method includes, for each of a plurality of log records received as part of a log stream from a host machine node, identifying a template identifier within a template repository for a template string matching an invariant string of the log record, and identifying an attribute identifier in an attribute repository for an attribute string matching a variant string of the log record. The log records are partitioned into batches. Each of the batches are defined by a data structure that includes the template identifier and the attribute identifier for each of the log records within the batch. The data structures for each of the batches are stored into a log repository.

In a further embodiment, a search query defining a search term and a time period to be searched is receive. A range of log identifiers to search is determined based on the time period. A selection among the batches of the log records is made based on the range of log identifiers. Batches of the log records are retrieved from the log repository based on the selecting. For each of the batches retrieved from the log repository, and for each of the log records of the batch, the template identifier and the attribute identifier of the log record are identified. The template string corresponding to the template identifier is retrieved from the template repository. The attribute string corresponding to the attribute identifier is retrieved from the attribute repository. The log record is generated based on the template string and the attribute string. The search term defined by the search query is searched for among the log records. The log records containing the search term are returned as a response to the search query.

Some other embodiments disclosed herein are directed to a computer program product that includes a computer readable storage medium having computer readable program code embodied therewith. The computer readable program code includes computer readable program code to, for each of a plurality of log records received as part of a log stream from a host machine node, identify a template identifier within a template repository for a template string matching an invariant string of the log record, and identify an attribute identifier in an attribute repository for an attribute string matching a variant string of the log record. Computer readable program code partitions the log records into batches, where each of the batches defined by a data structure comprising the template identifier and the attribute identifier for each of the log records within the batch. Computer readable program code stores the data structures for each of the batches into a log repository.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
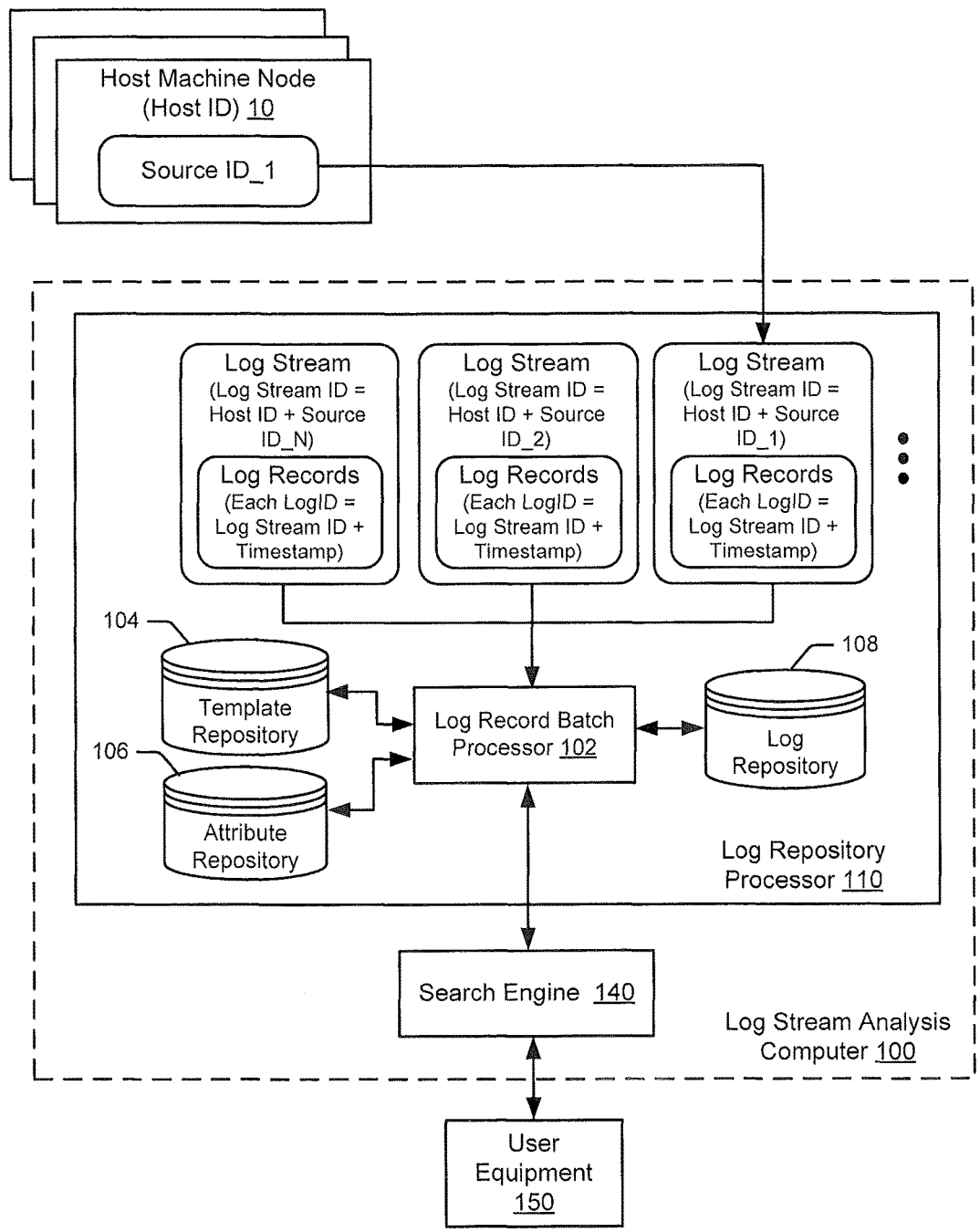
FIG. 1 is a block diagram of a system containing a log stream analysis computer that generates an attribute repository and a template repository which are used to batch process data structures of log records for storage in a log repository used to satisfy full-text search queries of the log stream, in accordance with some embodiments.

Some embodiments are disclosed herein in the context of the nonlimiting example block diagram of FIG. 1. A log stream analysis computer 100 receives log streams from one or more software sources executed by each of one or more host machine nodes 10. In the embodiment of FIG. 1, the log stream analysis computer 100 receives a log stream from Source ID_1 executed by the host machine node 10 identified by a Host ID, and can further receive log streams from other software sources executed by the same or other host machine nodes. A host machine node is also referred to as a "host node" and "host" for brevity.

A host machine node can include a physical host machine and/or a virtual machine (VM). The physical host machine includes circuitry that performs computer operations to execute one or more software sources. The physical host machine may include, without limitation, network content servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The physical host machine may include computer resources such as: processor(s), such as a central processing unit (CPU); network interface(s); memory device(s); mass data storage device(s), such as disk drives, solid state nonvolatile memory, etc.; etc.

A physical host machine can provide one or more VMs that execute one or more software sources. A virtual hypervisor can provide an interface between the VMs and a host operating system that allows multiple guest operating systems and associated software sources to run concurrently on a physical host machine. The host operating system is responsible for the management and coordination of activities and the sharing of the computer resources of the physical host machine.

Each software source belongs to a source type. For example, a "SQL Server" may be a source type and each installation of SQL Server is a software source belonging to the source type. Multiple sources of the same or different source types may be on the same host, and a software source may migrate between hosts. Each host and software source is identified by a unique identifier, Host ID and Source ID respectively. A log stream (generated by a software source of a particular host) can be uniquely identified by a compound identifier generated from combination of the Host ID and Source ID, or in some embodiments may be uniquely identified by an identifier generated from the Source ID.

The log stream analysis computer 100 includes a log record batch processor 102 that partitions the received log stream into a sequence of log records according to a defined time interval (e.g., a defined number of seconds, minutes, or hours) or other defined event or rule. Each log record may be uniquely identified by an identifier (LogID) that is formed from a combination (e.g., concatenation) of the corresponding (Log Stream ID) from which the record was partitioned and a timestamp associated with the defined time interval or other defined event or rule. When a single block stream is received from a host machine node, the log record may be uniquely identified based on the timestamp alone. The interval size can be determined based on a trade-off analysis between storage space requirements and accuracy.

In accordance with at least some embodiments disclosed herein, the log records of a log stream generated by a source (either a hardware server or a software application) correspond to templates within a defined set. Each template can, for example, correspond to a "print" or other output routine in the software code of the source, which has an invariant string (e.g., which does not vary between "prints" by the same print route) and a variant string (e.g., which can vary between "prints" by the same print routine) that is appended to the invariant string by the print statement whenever the print routine is executed. The invariant string may provide context for the variant string, such as a textual description that is intended for human understanding of the variant string, and which does not change between each repetition of the print routine or other output routine which generates the log stream. The variant string may be user names, IP addresses of the host machine nodes, event identifiers, values characterizing an application state at an instant of time, processing error codes, etc, that can vary between each repetition of the print routine or other output routine which generates the log stream.

The invariant string of a log record is referred to herein as a "template" and the variant string is referred to as an "attribute." The invariant strings (templates strings) are stored in a template repository 104 where they are logically associated with unique template identifiers. In contrast, the invariant strings (attribute strings) are stored in an attribute repository 106 are they are logically associated with unique attribute identifiers. Log records are significantly compressed by replacing the templates strings with the associated template identifiers and replacing the attribute strings with the associated attribute identifiers. The template identifiers can be used to subsequently retrieve the template strings from the template repository 104 and the attribute identifiers can be used to subsequently retrieve the attribute strings from the attribute repository 106.

Storage of Log Records in the Log Repository

The log record batch processor 102 processes the log records for storage in a log repository 108. For each of a plurality of log records received as part of the log stream, a template identifier is identified within a template repository 104 for a template string matching an invariant string of the log record. An attribute identifier is identified in an attribute repository 106 for an attribute string matching a variant string of the log record. The log records are partitioned into batches. Each of the batches are defined by a data structure that includes the template identifier and the attribute identifier for each of the log records within the batch. The data structures for each of the batches are stored into the log repository 108.

Figure 2:
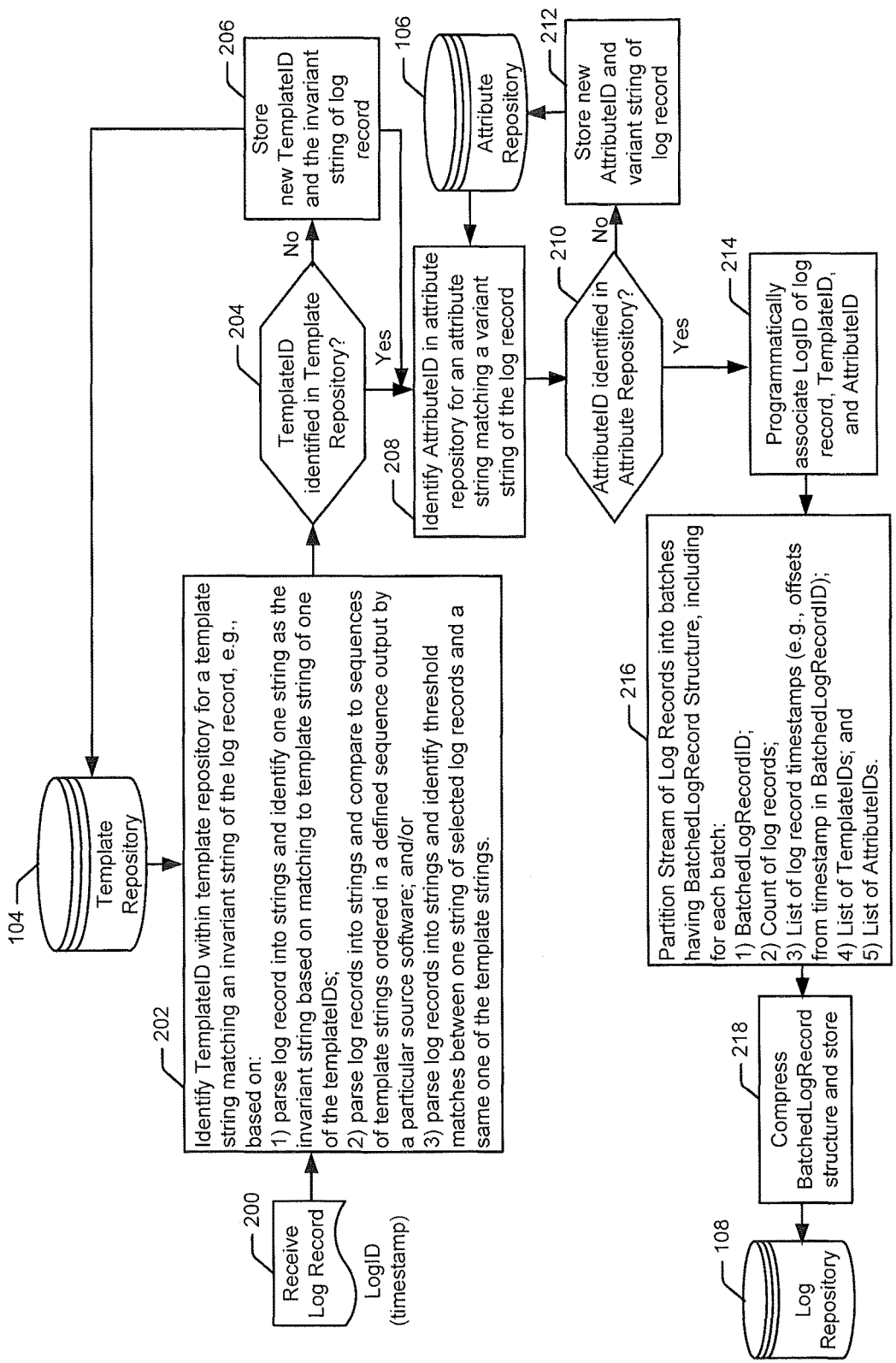
FIG. 2 is a flowchart of operations by a log record batch processor of the log stream analysis computer to use the attribute and template repositories to batch process data structures of log records for storage in the log repository, in accordance with some embodiments.

FIG. 2 is a flowchart of operations by the log record batch processor 102 to use the template and attribute repositories 104 and 106 to batch process data structures of log records for storage in the log repository 108, in accordance with some embodiments.

Referring to FIG. 2, the log record batch processor 102 receives (block 200) a log record which may be identified by a log ID which is unique across all of the log records. The log ID can be generated based on a timestamp for when the log record was generated. The timestamp is translated into some time unit (based on the log record generation rate) since a fixed point in time (called epoch). For example, suppose the time unit is seconds, the epoch is (Jan. 1, 2001 00:00:00 AM) and the log record was generated on Jun. 1, 2015 at 10:45:15 AM. The log ID will be the difference between the timestamp and the epoch, converted into seconds.

The log record batch processor 102 identifies (block 202) a template identifier within the template repository 104 for a template string matching an invariant string of the log record.

In one embodiment, the template identifier is identified based on a predefined rules that identify the structure of invariant string(s) and variant string(s) that are output by print routines or other output routines of a software source which is the source of the log stream. When this structure is not predefined by rules, the template identifier can be inferred using one of the following embodiments.

In one embodiment, the template identifier is identified based on parsing content of the log record to generate strings, comparing the strings to template strings within the template repository 104, identifying (block 202) one of the strings of the log record as the invariant string based on a match between the one of the strings and the template string, and identifying (block 208) the attribute identifier associated with the template string.

In another embodiment, the template identifier is identified based on parsing content of the log records to generate strings, comparing the strings of the log records to template strings within the template repository 104, identifying (block 202) one of the strings of selected ones of the log records as the invariant string of the selected ones of the log records based on at least a threshold number of matches occurring between the one of the strings of the selected ones of the log records to a same one of the template strings within the template repository 104, and identifying (block 208) the attribute identifier associated with the one of the template strings.

In another embodiment, the template identifier is identified based on parsing content of a sequence of the log record to generate strings, comparing the strings to template strings within the template repository 104 that are ordered in a defined sequence corresponding to an output sequence from a software source (Source ID_1) on the host machine node 10, identifying (block 202) one of the strings of the log record as the invariant string based on a match between the one of the strings and one of the template strings and further based on a previous match identified between one of the strings of a previous one of the log records and a previous one of the template strings in the defined sequence, and identifying (block 208) the attribute identifier associated with the one of the template strings.

When the log record batch processor 102 identifies (block 204) that no template string in the template repository 104 matches the invariant string of the log record, a new template identifier for the invariant string of the log record is generated. The new template identifier and the invariant string of the log record are then stored (block 206) in the template repository 104 with a defined logical association between the new template identifier and the invariant string of the log record.

When the log record batch processor 102 identifies (block 210) that no attribute string in the attribute repository 106 matches the variant string of the log record, a new attribute identifier for the variant string of the log record is generated. The new attribute identifier associated with the variant string of the log record are then stored (block 212) in the attribute repository 106 with a defined logical association between the new attribute identifier and the variant string of the log record.

The log record batch processor 102 programmatically (block 214) associates the log ID of the log record, the template ID, and attribute ID.

For fast lookup, the log repository 108 storing information derived from the log records needs to be indexed and partitioned. To reduce the resources that are required to insert, for example, thousands of log records for each source during each sec in the log repository 108, the log records are batch processed by the log record batch processor 102 before storing into the log repository 108. For every log stream, the log records are divided based on time intervals (configurable, based on the volume). All log records are batched for every interval into a BatchedLogRecord. The primary key for the BatchedLogRecord can be defined based on a prefix of the log ID. The time interval can be a power of 2 in the units of the timestamp.

For example, suppose the timestamp is in seconds and the time interval is 16 (2 to the power 4) seconds. In this case, all the log IDs belonging to a time interval will have the same bits for the 60 (64−4) most significant bits. This can be used as the primary key (batchedLogRecordID) for the BatchedLogRecord table. The last 4 bits will provide the offset of this log record in the BatchedLogRecord.

More generally, the log record batch processor 102 partitions (block 216) the log records into batches, where each of the batches is defined by a data structure that includes the template identifier and the attribute identifier for each of the log records within the batch. The data structure that defines a batch of the partitioned log records, can include a batched log record identifier (e.g., batchedLogRecordID) that uniquely identifies the batch relative to the other batches, the template identifier for each of the log records within the batch, the attribute identifier for each of the log records within the batch, and a list of timestamps of the log records within the batch. The data structure may further include a count of the log records within the batch.

The log record batch processor 102 stores (block 218) the data structures for each of the batches into the log repository 108. As part of the storing operation, the log record batch processor 102 may performing data compression on the data structures for each of the batches to generate compressed a compressed data structure for each of the batches, and then store the compressed data structure for each of the batches into the log repository 108.

In the example above, when the partition log records were stored in the log repository 108 with a BatchedLogRecords identifier, the resource overhead to store the partitioned log records can be based on 1 insertion into the repository 108 for each batch interval for each source. Thus, for 16 second batch intervals, a batch of portioned log records is written to the log repository 108 every 16 seconds per source. This resource overhead may be more easily handled by the log repository 108 (e.g., a relational database management system) than much more frequent writing of individual (non-batched) log records. Furthermore, the resource overhead can remain substantially the same irrespective of the number of log records generated per second.

In the BatchedLogRecord structure disclosed above, all the values in a BatchedLogRecord can be integers. The BatchedLogRecord structure for one BatchedLogRecord can therefore comprise a sequence of integers which can be efficiently and significantly compressed before storage into the log repository 108, and efficiently decompressed when retrieved therefrom.

A new BatchedLogRecord may be generated with every new time interval for a log source. Every log record from that source during that interval is added to the BatchedLogRecord. In case of a system failure, the BatchedLogRecord can be rebuilt from the log records for that interval. Accordingly, there may not be a need to log the BatchedLogRecord that is not yet written to the log repository 108. At the interval end, the BatchedLogRecord can be compressed using a numerical string compression algorithm, and then written to the log repository 108 (e.g., a regular relational table) using BacthedLogRecordID as the primary reference key. The log repository 108 may be partitioned as needed.

Searching Log Records in the Log Repository

A search engine 140 is provided that allows a user, via user equipment 150 (e.g., desktop computer, laptop computer, tablet computer, smart phone, etc.), to perform full text searches of content of the log records referenced by the data structures in the log repository 108. The search engine 140 communicates a search query to the log record batch processor 102.

For retrieval, a plurality of log IDs can be identified as the result of running the search query. The log IDs can be grouped based on the time intervals. For each time interval, the corresponding BatchedLogRecords are retrieved from the log repository 108 (by deriving the primary key of the BatchedLogRecord from the log ID), uncompressed (assuming they were compressed before being written into the log repository 108), and the log records are rebuilt for all the log IDs that belong to that time interval from their template ID and attribute value IDs.

Figure 3:
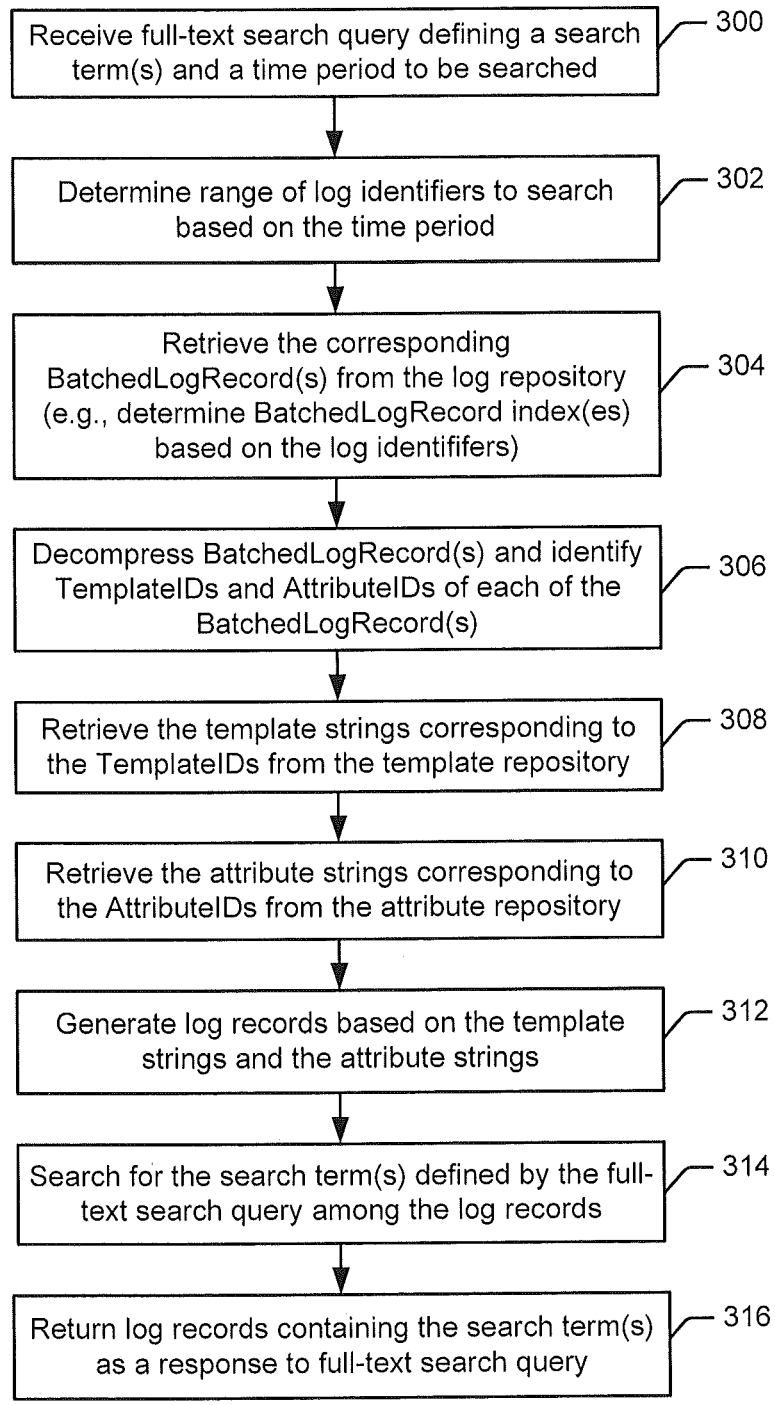
FIG. 3 is a flowchart of operations by the log record batch processor of the log stream analysis computer to search the batched data structures of log records in the log repository to identify log records that satisfies a full-text search query, in accordance with some embodiments.

FIG. 3 illustrates a flowchart of operations that may be performed by the log record batch processor 102 responsive to receipt of a full-text search query, in accordance with some embodiments. The operations may alternatively or additionally be performed partially or entirely by the search engine 140.

Referring to FIG. 3, the full-text search query is received (block 300). The full-text search query defines one or more search terms and a time period to be searched. For simplicity of explanation, it is assumed that the search query defined one search term. A range of log identifiers to search is determined (block 302) based on the time period. Operations are performed to select among the batches of the log records based on the range of log identifiers. Batches of the log records are retrieved (block 304) from the log repository 108 based on the selecting.

For each of the batches retrieved from the log repository, and for each of the log records of the batch, operations are repeated to identify (block 306) the template identifier and the attribute identifier of the log record, retrieved (block 308) the template string corresponding to the template identifier from the template repository 108, retrieve (block 310) the attribute string corresponding to the attribute identifier from the attribute repository 108, and generate (block 312) the log record based on the template string and the attribute string.

The search term defined by the search query is searched (block 310) for among the log records that are generated. The log records containing the search term are returned (block 316) as a response to the search query. For example, when the user equipment 150 was the source of the search query, the log records containing the search term can be communicated to the user equipment 150.

Example Log Stream Analysis Computer

Figure 4:
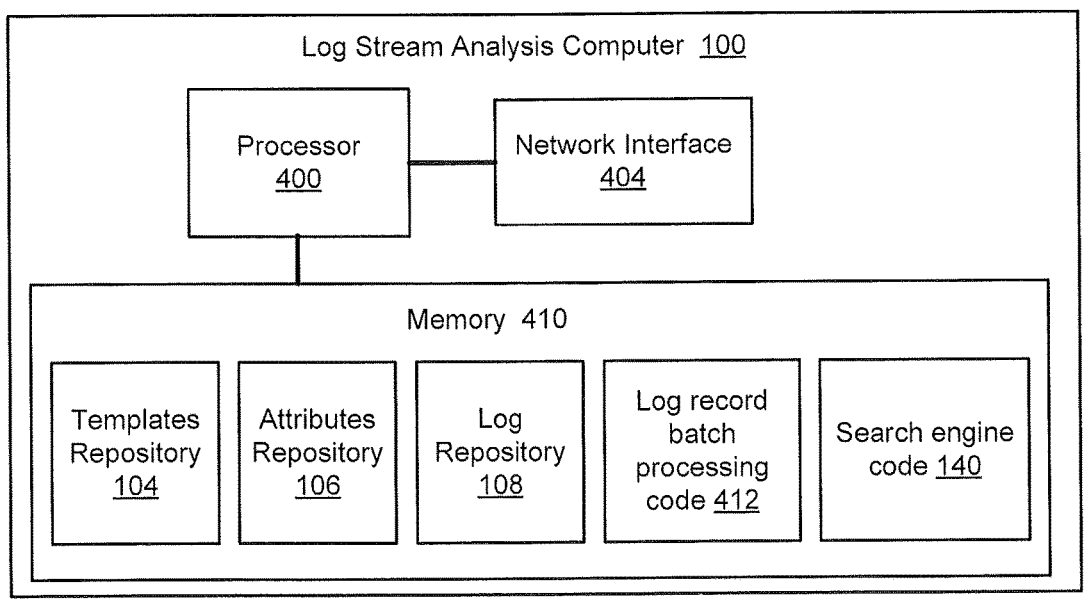
FIG. 4 is a block diagram of a log stream analysis computer configured according to some embodiments.

FIG. 4 is a block diagram of the log stream analysis computer 100 or a component thereof in FIG. 1 configured according to one embodiment. Referring to FIG. 4, a processor 400 may include one or more data processing circuits, such as a general purpose and/or special purpose processor (e.g., microprocessor and/or digital signal processor) that may be collocated or distributed across one or more networks. The processor 400 is configured to execute computer readable program code in a memory 410, described below as a computer readable medium, to perform some or all of the operations and methods disclosed herein for one or more of the embodiments. The program code can include log record batch processing code 412, search engine code 140, the template repository 104, the attribute repository 106, and the log repository 108. The log record batch processing code 412 can be computer readable program code to perform at least some of the operations disclosed herein regarding FIG. 2 and/or FIG. 3. The search engine code 416 can be computer readable program code to perform to perform at least some of the operations disclosed herein regarding the search engine 140 and/or FIG. 3. Although a single memory block 410 has been illustrated for simplicity, it is to be understood that any number, combination of types, and hierarchy of memory storage devices (e.g., solid state memory devices, disk drives, etc.) can be used. A network interface 404 can communicatively connect the processor 400 to the host machine nodes 10, the search engine 140, and the user equipment 150 shown in FIG. 1.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a computer comprising:
   for each of a plurality of log records received from a host machine node as part of a log stream being output from a software source via the host machine node:
      identifying a template identifier within a template repository for a template string matching an invariant string of the log record; and
      identifying an attribute identifier in an attribute repository for an attribute string matching a variant string of the log record;
   partitioning the log records into a plurality of batches, each of the plurality of batches comprising a plurality of log records, each of the plurality of batches defined by a data structure comprising:
      a batched log record identifier that uniquely identifies the batch relative to the other batches;
      the template identifier for each of the plurality of log records within the batch;
      the attribute identifier for each of the plurality of log records within the batch; and
      a list of timestamps of the plurality of log records within the batch; and for each batch of the plurality of batches, storing the data structure for the batch into a log repository in a computer readable medium, the storing comprising:
for each batch of the plurality of batches, performing data compression on the data structure for the batch to generate a compressed data structure; and
for each batch of the plurality of batches, separately communicating, through a data network to a data server, an instruction to write the compressed data structure for the batch into memory of a log repository.

2. The method of claim 1, wherein the identifying a template identifier within the template repository for a template string matching an invariant string of the log record, comprises:
parsing content of the log record to generate strings;
comparing the strings to template strings within the template repository;
identifying one of the strings of the log record as the invariant string based on a match between the one of the strings and the template string; and
identifying the attribute identifier associated with the template string.

3. The method of claim 1, wherein the identifying a template identifier within the template repository for a template string matching an invariant string of the log record, comprises:
parsing content of the log records to generate strings;
comparing the strings of the log records to template strings within the template repository;
identifying one of the strings of selected ones of the log records as the invariant string of the selected ones of the log records based on at least a threshold number of matches occurring between the one of the strings of the selected ones of the log records to a same one of the template strings within the template repository; and
identifying the attribute identifier associated with the one of the template strings.

4. The method of claim 1, wherein the identifying a template identifier within the template repository for a template string matching an invariant string of the log record, comprises:
parsing content of a sequence of the log record to generate strings;
comparing the strings to template strings within the template repository that are ordered in a defined sequence corresponding to an output sequence from a software source on the host machine node;
identifying one of the strings of the log record as the invariant string based on a match between the one of the strings and one of the template strings and further based on a previous match identified between one of the strings of a previous one of the log records and a previous one of the template strings in the defined sequence; and
identifying the attribute identifier associated with the one of the template strings.

5. The method of claim 1, further comprising:
generating a new template identifier for the invariant string of the log record based on identifying that no template string in the template repository matches the invariant string of the log record; and
storing the new template identifier and the invariant string of the log record in the template repository with a logical association between the new template identifier and the invariant string of the log record.

6. The method of claim 1, further comprising:
generating a new attribute identifier for the variant string of the log record based on identifying that no attribute string in the attribute repository matches the variant string of the log record; and
storing the new attribute identifier associated with the variant string of the log record in the attribute repository with a logical association between the new attribute identifier and the variant string of the log record.

7. The method of claim 1, wherein:
for each of the plurality of batches, the log records within the batch have timestamps within a defined time period.

8. The method of claim 1, further comprising:
receiving a search query defining a search term and a time period to be searched;
determining a range of log identifiers to search based on the time period;
selecting among the plurality of batches of the log records based on the range of log identifiers;
retrieving at least one compressed data structure corresponding to at least one batch of the plurality of batches of the log records from the log repository based on the selecting;
for each batch of the at least one batch of the plurality of batches retrieved from the log repository,
performing decompression on the compressed data structure;
for each of the plurality of log records of the batch,
identifying the template identifier and the attribute identifier of the log record;
retrieving the template string corresponding to the template identifier from the template repository;
retrieving the attribute string corresponding to the attribute identifier from the attribute repository; and
generating the log record based on the template string and the attribute string;
searching for the search term defined by the search query among the log records; and
returning the log records containing the search term as a response to the search query.

9. The method of claim 1, further comprising:
decompressing the plurality of batches of the log records retrieved from the log repository before the identifying the template identifier and the attribute identifier of the log record.

10. The method of claim 1, wherein each log record corresponds to a routine,
wherein identifying a template identifier within a template repository for a template string matching an invariant string of the log record comprises matching the invariant string with the invariant string of at least one other log record corresponding to the routine; and
wherein identifying an attribute identifier in an attribute repository for an attribute string matching a variant string of the log record comprises identifying an attribute identifier in an attribute repository for an attribute string matching a variant string of the log record that is different from the variant string of at least one other corresponding log record.

11. A computer program product comprising:
a non-transitory computer readable storage medium having computer readable program code embodied therewith, the computer readable program code comprising:
computer readable program code to, for each of a plurality of log records received from a host machine node as part of a log stream from a software source via the host machine node, perform:

identifying a template identifier within a template repository for a template string matching an invariant string of the log record; and identifying an attribute identifier in an attribute repository for an attribute string matching a variant string of the log record;

computer readable program code to partition the log records into a plurality of batches, each of the plurality of batches comprising a plurality of log records, each of the plurality of batches defined by a data structure comprising:

a batched log record identifier that uniquely identifies the batch relative to the other batches;

the template identifier for each of the plurality of log records within the batch;

the attribute identifier for each of the plurality of log records within the batch; and a list of timestamps of the plurality of log records within the batch; and computer readable program code to, for each batch of the plurality of batches, store the data structure for the batch into a log repository, the storing comprising:

for each batch of the plurality of batches, performing data compression on the data structure for the batch to generate a compressed data structure; and for each batch of the plurality of batches, separately communicating, through a data network to a data server, an instruction to write the compressed data structure for the batch into memory of a log repository.

12. The computer program product of claim 11, wherein the computer readable program code to identify a template identifier within the template repository for a template string matching an invariant string of the log record, comprises:

computer readable program code to parse content of the log record to generate strings;

computer readable program code to compare the strings to template strings within the template repository;

computer readable program code to identify one of the strings of the log record as the invariant string based on a match between the one of the strings and the template string; and computer readable program code to identify the attribute identifier associated with the template string.

13. The computer program product of claim 11, wherein the computer readable program code to identify a template identifier within the template repository for a template string matching an invariant string of the log record, comprises:

computer readable program code to parse content of the log records to generate strings;

computer readable program code to compare the strings of the log records to template strings within the template repository;

computer readable program code to identify one of the strings of selected ones of the log records as the invariant string of the selected ones of the log records based on at least a threshold number of matches occurring between the one of the strings of the selected ones of the log records to a same one of the template strings within the template repository; and computer readable program code to identify the attribute identifier associated with the one of the template strings.

14. The computer program product of claim 11, wherein the computer readable program code to identify a template identifier within the template repository for a template string matching an invariant string of the log record, comprises:

computer readable program code to parse content of a sequence of the log record to generate strings;

computer readable program code to compare the strings to template strings within the template repository that are ordered in a defined sequence corresponding to an output sequence from a software source on the host machine node;

computer readable program code to identify one of the strings of the log record as the invariant string based on a match between the one of the strings and one of the template strings and further based on a previous match identified between one of the strings of a previous one of the log records and a previous one of the template strings in the defined sequence; and computer readable program code to identify the attribute identifier associated with the one of the template strings.

15. The computer program product of claim 11, further comprising:

computer readable program code to generate a new template identifier for the invariant string of the log record based on identifying that no template string in the template repository matches the invariant string of the log record; and computer readable program code to store the new template identifier and the invariant string of the log record in the template repository with a logical association between the new template identifier and the invariant string of the log record.

16. The computer program product of claim 11, further comprising:

computer readable program code to generate a new attribute identifier for the variant string of the log record based on identifying that no attribute string in the attribute repository matches the variant string of the log record; and computer readable program code to store the new attribute identifier associated with the variant string of the log record in the attribute repository with a logical association between the new attribute identifier and the variant string of the log record.

17. The computer program product of claim 11, further comprising:

computer readable program code to receive a search query defining a search term and a time period to be searched;

computer readable program code to determine a range of log identifiers to search based on the time period;

computer readable program code to select among the plurality of batches of the log records based on the range of log identifiers;

computer readable program code to retrieve at least one compressed data structure corresponding to at least one batch of the plurality of batches of the log records from the log repository based on the selecting;

for each batch of the plurality of batches retrieved from the log repository, computer readable program code to perform decompression on the compressed data structure;

for each of the plurality of log records of the batch, computer readable program code to identify the template identifier and the attribute identifier of the log record;

computer readable program code to retrieve the template string corresponding to the template identifier from the template repository;

computer readable program code to retrieve the attribute string corresponding to the attribute identifier from the attribute repository; and computer readable program code to generate the log record based on the template string and the attribute string;

computer readable program code to search for the search term defined by the search query among the log records; and computer readable program code to return the log records containing the search term as a response to the search query.

* * * * *